UNITED STATES PATENT OFFICE.

AARON JEDEL, OF NEW YORK, N. Y.

PYROTECHNIC ARTICLE AND METHOD OF MAKING SAME.

1,265,205.        Specification of Letters Patent.     Patented May 7, 1918.

No Drawing.     Application filed April 23, 1915. Serial No. 23,452.

*To all whom it may concern:*

Be it known that I, AARON JEDEL, a citizen of the United States, residing at New York, in the county of New York and State of New York, have invented new and useful Improvements in Pyrotechnic Articles and Methods of Making Same, of which the following is a specification.

This invention relates to pyrotechnic compositions which may be molded into any desired form, which shall present the following advantages over similar pyrotechnic compositions heretofore employed, in that it shall be water-proof and stable against atmospheric changes, that it produces no smoke, or only a minimum quantity of fumes upon combustion, that it will be cheaper and more convenient to make, and that it will be easy to make a more intimate admixture of the ingredients, and that by means of the particular manner in which the materials are compounded it will be possible to secure a more perfect combustion than is possible with those heretofore employed. Other advantages will be apparent as the invention is developed.

The composition consists preferably of the following ingredients, although I desire to state that certain substitution of ingredients can be made without departing from the spirit of the invention, and the proportions are given for the purpose of illustration only, since these may be varied more or less depending upon the purity of the materials, the rate of combustion desired in the final product, and certain other conditions.

25 parts of strontium nitrate.
    5 parts of red gum (gum accroides).
    3 parts potassium chlorate.

In this formula I may substitute other color producing material, in place of the strontium nitrate, such as barium compounds to produce certain green colors, copper compounds to produce certain green or blue colors, or the like, and in place of potassium chlorate, certain other oxidizing substances can be employed, or mixtures of potassium chlorate and certain other oxidizers may be employed, for the purpose of varying the speed of combustion of the product. The mixtures above referred to, or suitable equivalents thereof are mixed together in the form of dry powders, in any suitable mixing machine, or mixing mill, in order to produce a complete and intimate mixture of the ingredients. The mixture may then be placed into a suitable mold, and is heated to a temperature sufficient to partially fuse or melt the gum accroides, in which step a temperature of 150° F. (more or less depending upon the purity of the materials, the amount of the gum in the mixture, the size and shape of the mass, and other conditions) is employed. The material may then be subjected to slight pressure, either during or after the fusing operation, and is thereafter allowed to cool to harden, and is then ready for packing and shipping.

It will be obvious that by means of this invention it becomes unnecessary to pack the powder in paste board tubes, tin boxes or the like, which add greatly to the expense of the finished product, both on account of the cost of such containers, and on account of the necessity of using high grade labor for this purpose.

On the account of the fusion and resolidification of the gum accroides, it produces a much more complete and intimate admixture of the ingredients, than can be produced by the ordinary methods, such as grinding alone, or mixing with solvents, such as alcohol, and the reëvaporation of these solvents. A further disadvantage in the use of alcohol or other solvents, consists in the greatly increased cost of manufacture, if these are used.

I call attention to the fact that molds of any suitable size and shape may be employed, in order to give plates, balls (similar to marbles) triangles, cones, rods (which may be provided if desired with a suitable core of wire, in order to strengthen the same and to reduce the liability of breakage during transportation) or any other desired shape.

If so desired, the rods or other shapes may be provided with suitable handles of relatively non-combustible material, such as wood, or metal, or these may be provided with spikes, in order to use the same for railroad fusees and the like.

I call attention to the fact that in heating the mixture, in order to fuse or partially fuse the gum, the temperature employed is very much below that necessary for decomposing or causing ignition of the nitrate and chlorate, since it is obvious that any ignition of this kind would entirely spoil the composition, and also would be dangerous to the workmen and to the plant.

In connection with shellac or like materials which have heretofore been proposed for bonding pyrotechnic mixtures, solvents have been employed, and it has been found that the use of such solvents as alcohol, turpentine, water and the like does not produce such a thorough and complete mixture of the materials, and does not produce as hard and coherent a final product as may be obtained by fusion and resolidification, nor does it produce a product having the waterproof properties of the product of my present process.

In regard to the above statement that this material is water proof, I have tested this property of the material by immersing a formed article made in accordance with the description herein, in water, for three hours, at the end of which time the superfluous water was wiped from the upper part of the article, and the same ignited by means of a match, and burned with about the same rapidity as a similar article which had not been wet.

I have also tested materials made in accordance with this process as regards their safety, by heating the same to a temperature of 350 to 400° F., during which time no inflammable gases whatever were given off.

This material also can not be ignited by friction or concussion, since I have broken up several pieces, by hammering the same on an iron plate, also have ground up several pieces in a mortar with a pestle, and no ignition could be produced thereby.

What I claim is:

1. The method of producing a pyrotechnic composition which consists in mixing a finely powdered oxidizing agent, a medium for producing a colored light, and a waterproof material placing said mixture in a mold and then baking said mixture to cause the said water-proof material to inclose said oxidizing agent and the color producing agent and to shape said mixture.

2. A method of producing a pyrotechnic composition which consists of mixing finely powdered potassium chlorate, strontium nitrate and a fusible water-insoluble gum, placing said mixed powders in a mold and baking to melt said gum causing it to surround said nitrate and chlorate and to shape said materials into a briquet.

In testimony whereof I affix my signature in presence of two witnesses.

AARON JEDEL.

Witnesses:
L. W. LOVETT,
R. R. LOVETT.

Copies of this patent may be obtained for five cents each, by addressing the "Commissioner of Patents, Washington, D. C."